US008903785B2

(12) United States Patent
Charboneau et al.

(10) Patent No.: US 8,903,785 B2
(45) Date of Patent: Dec. 2, 2014

(54) BASELINES OVER INDEXED, VERSIONED DATA

(75) Inventors: David P. Charboneau, Durham, NC (US); Simon K. Johnston, Snohomish, WA (US); Philippe P. Mulet, Saint-Nazaire (FR)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 12/883,119

(22) Filed: Sep. 15, 2010

(65) Prior Publication Data

US 2012/0066228 A1 Mar. 15, 2012

(30) Foreign Application Priority Data

Sep. 13, 2010 (EP) ..................................... 10305978

(51) Int. Cl.
*G06F 17/30* (2006.01)
(52) U.S. Cl.
CPC .... *G06F 17/30312* (2013.01); *G06F 17/30309* (2013.01)
USPC ......................................................... 707/695
(58) Field of Classification Search
CPC ............ G06F 17/3023; G06F 17/2288; G06F 17/30309
USPC ................................................. 707/638, 695
See application file for complete search history.

(56) References Cited

U.S. PATENT DOCUMENTS

| 7,664,798 | B2 | 2/2010 | Wood et al. | |
|---|---|---|---|---|
| 7,707,183 | B2 | 4/2010 | Alstrin et al. | |
| 2003/0115223 | A1* | 6/2003 | Scott et al. ..................... | 707/203 |
| 2003/0208490 | A1 | 11/2003 | Larrea et al. | |
| 2004/0249823 | A1* | 12/2004 | Raghuvir et al. ............. | 707/100 |
| 2005/0071390 | A1* | 3/2005 | Midgley et al. ............... | 707/204 |
| 2007/0088766 | A1* | 4/2007 | Bodge et al. .................. | 707/203 |
| 2007/0143752 | A1 | 6/2007 | Clemm et al. | |
| 2007/0220507 | A1 | 9/2007 | Back et al. | |
| 2007/0226024 | A1 | 9/2007 | Harvey et al. | |
| 2009/0307277 | A1 | 12/2009 | Grubov et al. | |
| 2010/0122120 | A1 | 5/2010 | Lin | |
| 2010/0174682 | A1 | 7/2010 | Alstrin et al. | |

OTHER PUBLICATIONS

Evans, R.P., S. Park, and M. Merriman, "Engineering Baselines in System Development: Using ASCII Files, Two-Column Index Files, and System Numbers, Engineering Tags, and Change Set Numbers", Proceedings of the First IEEE International Conference on Engineering of Complex Computer Systems, Nov. 1995, 4 pp.

(Continued)

*Primary Examiner* — Thu-Nguyet Le
(74) *Attorney, Agent, or Firm* — Janaki K. Davda; Konrad, Raynes, Davda & Victor LLP

(57) ABSTRACT

Provided are techniques for receiving a request to create a current baseline with a baseline identifier and selecting data elements that are to be included in the current baseline. For each of the data elements, for a version of the data element to be included in the current baseline, a reference to the version of the data element is added to the current baseline and a baseline index element for the version of the data element is maintained by one of creating a new baseline index element or updating an existing baseline index element.

21 Claims, 10 Drawing Sheets

(56) References Cited

OTHER PUBLICATIONS

Ratanotayanon, S., H.J. Choi, and S.E. Sim, "My Repository Runneth Over: An Empirical Study on Diversifying Data Sources to Improve Feature Search", Proceedings of the 18th IEEE International Conference on Program Comprehension, 2010, 10 pp.

AlfrescoWiki, "AVM", [online], [Retrieved on Sep. 20, 2010]. Retrieved from the Internet at URL: <http://wiki.alfresco.com/wiki/Versioned_Directories>, Last modified on Jul. 23, 2009, Total 6 pp.

AlfrescoWiki, "WCM Overview", [online], [Retrieved on Sep. 20, 2010]. Retrieved from the Internet at URL: <http://wiki.alfresco.com/wiki/WCM_Overview>, Last modified on Jul. 23, 2009, Total 8 pp.

Interwoven, "Datasheet Interwoven ControlHub", © 2007 Interwoven, Inc., Total 2 pp.

Sussman, B.C., B.W. Fitzpatrick, and C.M. Pilato, "Version Control with Subversion for Subversion 1.5 (Compiled from r3305)", © 2002-2008, Total 90 pp.

* cited by examiner

400

<http://example.org/data/e1.r1> dc:title "Some Resource".
<http://example.org/data/e1.r1> dc:description "Some interesting resource.".
<http://example.org/data/e1.r1> dc:created "2009-08-19T10:55:00Z".

<http://example.org/data/e1.r1> dc:title "Some Resource".
<http://example.org/data/e1.r1> dc:description "Some interesting resource.".
<http://example.org/data/e1.r1> dc:created "2009-08-19T10:55:00Z".
<http://example.org/data/e1.r1> bl:participatesIn <http://example.org/baselines/baseline-1>.
<http://example.org/data/e1.r1> bl:participatesIn <http://example.org/baselines/baseline-2>.
<http://example.org/data/e1.r1> bl:participatesIn <http://example.org/baselines/baseline-3>.

FIG. 5

BASELINES OVER INDEXED, VERSIONED DATA

CROSS-REFERENCE TO RELATED FOREIGN APPLICATION

This application is a non-provisional application that claims priority benefits under Title 35, Unites States Code, Section 119(a)-(d) or Section 365(b) of European Patent (EP) Application entitled "BASELINES OVER INDEXED, VERSIONED DATA", having EP Application No. EP10305978.8, filed on Sep. 13, 2010, by David P. CHARBONEAU, Simon K. JOHNSTON, and Philippe P. MULET, which application is incorporated herein by reference in its entirety.

BACKGROUND

1. Field

Embodiments of the invention relate to creating and deleting baselines over indexed, versioned data.

2. Description of the Related Art

Historical views, which are also referred to as "baselines," are created for a data store that holds indexed and versioned data. That is, the data store holds data elements. The data elements may be indexed. Also, different versions of the data elements may be stored. A baseline may be described as a named configuration of specific data element revisions in the data store that represents the state of the data store at a particular point in time (similar to a snapshot of the data).

First, although data elements in the data store are indexed, many conventional systems do not include the index data (also referred to as index elements) in the baseline. Thus, conventional systems can identify the versions of data elements in a baseline, but, because conventional systems do not preserve the index properties, the contents of the baseline are not available for query or search.

Second, to support query or search, come conventional systems may maintain the index properties corresponding to every version of a data element, whether or not that data element version participates in a baseline.

Thus the first and second solutions are unsatisfactory. The issue with the first solution is that users have a hard time answering common questions, such as "find all high priority items, for customer X, in baseline Y". In the case of the second solution, the index data is available for query, but a huge amount of the storage is used by data that is irrelevant and not useful in supporting user scenarios. In cases in which the second solution is used, the size of the resulting index degrades the performance of common operations.

Additionally some conventional solutions require that a database be "locked" while a baseline is created. That is, no further edits can be made to data elements in the data store while the baseline is created to prevent the inclusion of newer states that were created after the baseline was requested.

Thus, there is a need for baselines over indexed, versioned data.

BRIEF SUMMARY

Provided are a method, computer program product, and system for receiving a request to create a current baseline with a baseline identifier and selecting data elements that are to be included in the current baseline. For each of the data elements, for a version of the data element to be included in the current baseline, a reference to the version of the data element is added to the current baseline and a baseline index element for the version of the data element is maintained by one of creating a new baseline index element or updating an existing baseline index element.

BRIEF DESCRIPTION OF THE SEVERAL VIEWS OF THE DRAWINGS

Referring now to the drawings in which like reference numbers represent corresponding parts throughout:

FIG. 4 illustrates, in a block diagram, an example index element in accordance with certain embodiments.

FIG. 5 illustrates, in a block diagram, an index element that participates in three baselines in accordance with certain embodiments.

FIG. 6 is formed by FIGS. 6A and 6B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
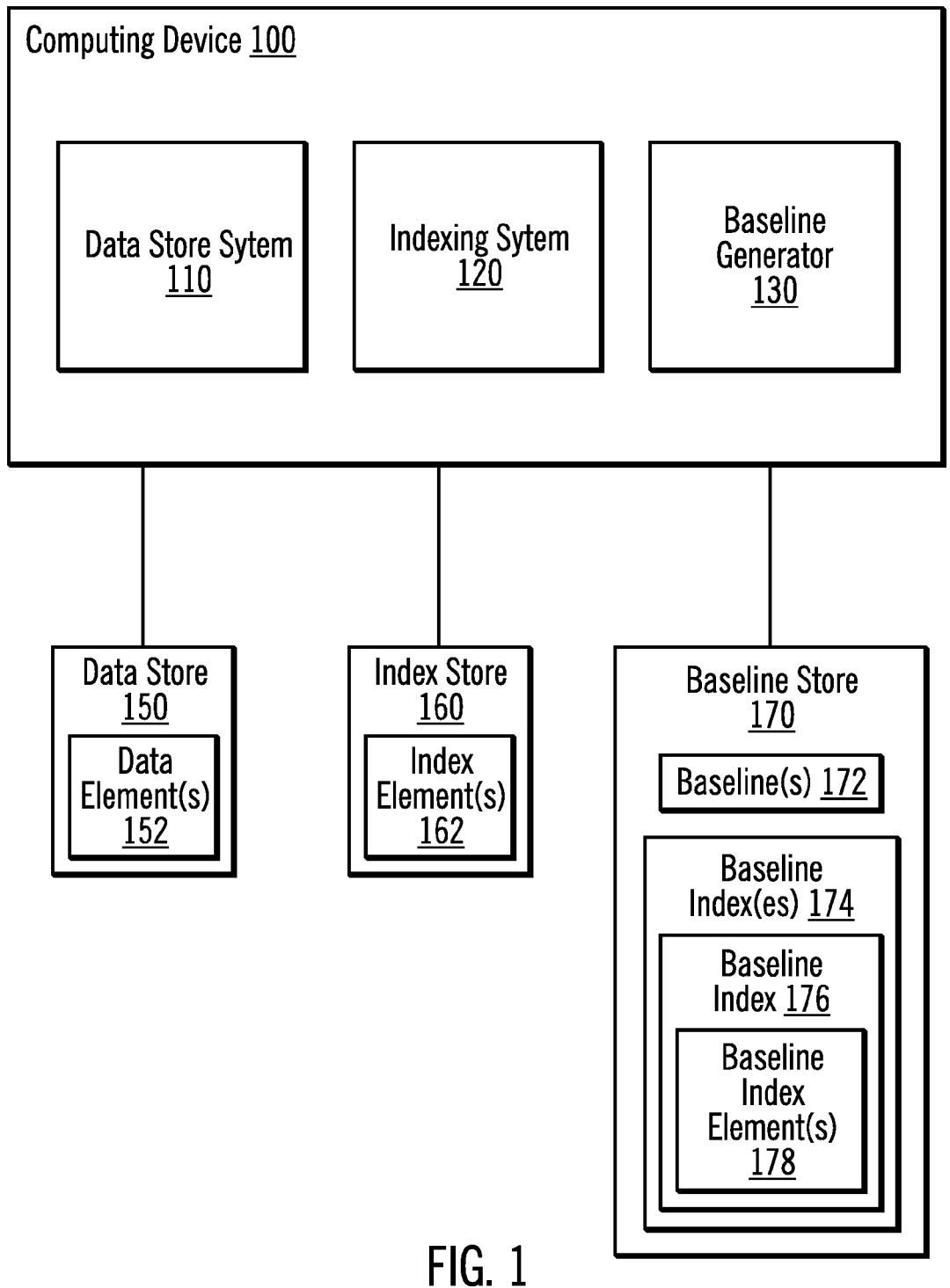
FIG. 1 illustrates, in a block diagram, a computing architecture in accordance with certain embodiments.

FIG. 1 illustrates, in a block diagram, a computing architecture in accordance with certain embodiments. A computing device 100 includes a data store system 110 that provides access (e.g., read/write access to retrieve data elements, update data elements, create data elements, delete data elements, etc.) for an application to the data store 150. The data store 150 stores one or more data elements 152. In certain embodiments, the data store system 110 is a database system, and the data store 150 is a database.

The computing device 100 also includes an indexing system 120 that indexes the data elements in the data store 150 and stores one or more index elements 162 (also referred to as index data) in the index store 160.

In addition, the computing device 100 includes a baseline generator 130 for generating one or more baselines 172 and one or more baseline indexes 174 that are stored in the baseline store 170. Thus, the baseline store 170 contains both baselines 172 and baseline indexes 174. A baseline 172 refers to a set of specific versions of data elements 152 still located in the data store 150 (i.e., there is no duplication of the data elements 152). Each baseline 172 has a corresponding baseline index 174 co-located in the baseline store 170. A baseline index 174 is formed of baseline index elements (i.e., a set of index elements which have each been augmented with a baseline tag (which are extra properties to record participation in a baseline). For example, baseline index 176 includes baseline index elements 178.

The data store 150 contains the original data elements 152 and any versions of the data elements 152. The data elements 152 may be files, documents, tables or other digital media. The data elements 152 are versioned in that each update to a data element 152 creates a new state of the data element 152. The index store 160 contains index elements 162 corresponding to the data elements 152. The index elements 162 may be described as queryable properties (i.e., the index elements 162 may be queried or searched). The baseline store 170 contains a baseline 172 and a baseline index 174 pertaining to versions of data elements 152 selected for the baseline 172. The baseline store 170 contains copies of the index elements 162 in the index store 160 that pertain to those revisions of data elements 152 in the data store 150 that are participating in baselines 172. The copies of the index elements 162 are augmented with baseline tags and stored in baseline indexes 174. The baseline index elements may be described as queryable properties (i.e., the baseline index elements may be queried or searched).

Figure 2:
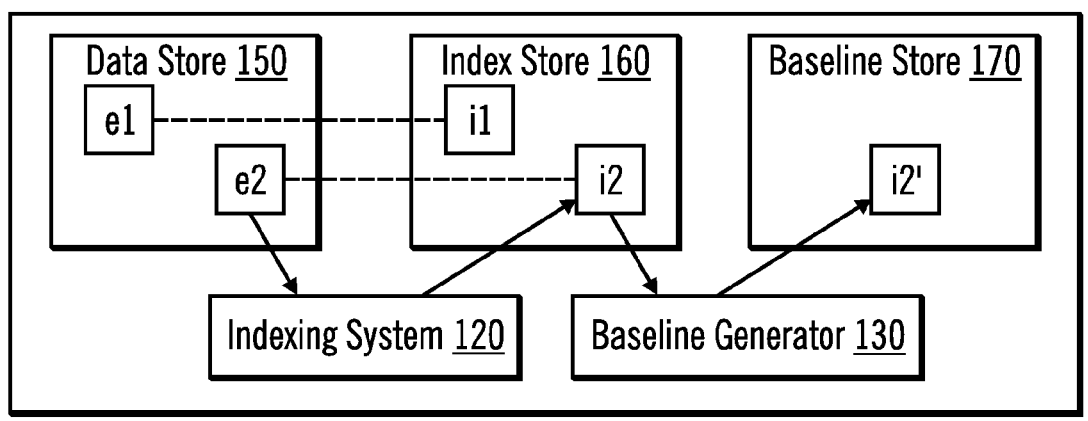
FIG. 2 illustrates, in a block diagram, an example of creating a baseline in accordance with certain embodiments.

FIG. 2 illustrates, in a block diagram, an example of creating a baseline in accordance with certain embodiments. In FIG. 2, the data elements (e.g., e1, e2) are data elements stored by an application. In FIG. 2, the index elements (e.g., i1, i2) may be described as sets of properties specific to a particular data element, and there is a 1:1 relationship between a data element and an index element. The indexing system 120 creates an index element for a data element (e.g., i1 is created for e1, and i2 is created for e2). The baseline generator 130 generates baseline index elements (e.g., baseline index element (i2')), which is a copy of the index element (i2) from the index store 160, augmented with baseline tags.

Figure 3:
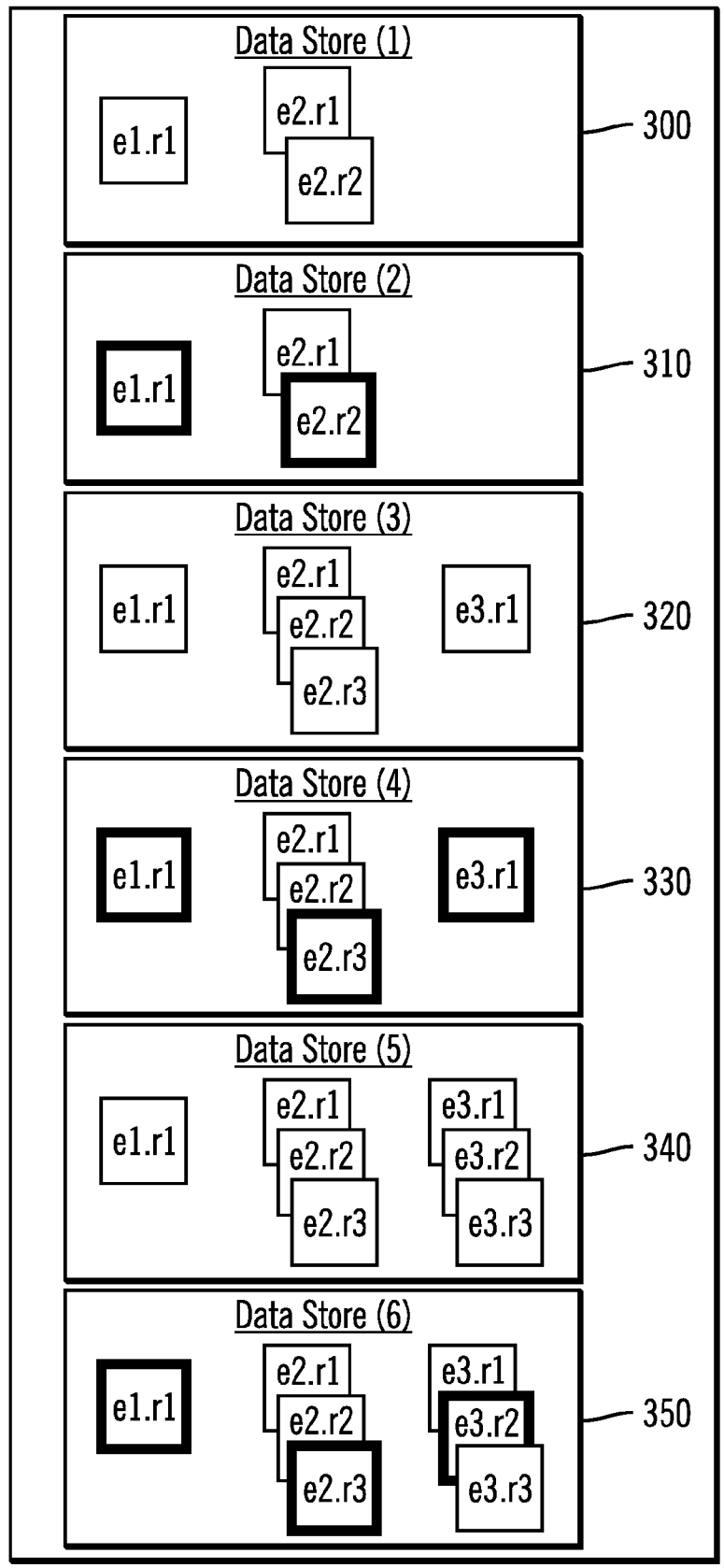
FIG. 3 illustrates, in a block diagram, an example of states of a data store at different points in time in accordance with certain embodiments.

The baseline generator 130 constructs enough baseline index elements to support query and search over the baseline data elements without having to have the original index store 150 maintain an index for every version of every data element in the original data store 150. FIG. 3 illustrates, in a block diagram, an example of states of a data store at different points in time in accordance with certain embodiments. The data store of FIG. 3 is an example of data store 150. In FIG. 3, the data store contains versions of data elements. The label "em" is used to refer to an element (e.g., e1, e2, and e3 are data elements), where "m" is an integer. The label "rn" is used to refer to a version of an element, wherein "n" is an integer, and each of the data elements has 1 . . . n versions (the versions are shown named r1 . . . rn and grouped by data element). For example, (e3.r2) describes element 3, version 2. FIG. 3 illustrates six states of the data store to enhance understanding of the invention.

In state 300, the data store contains two data elements (e1, e2), data element one has a single version (e.r1) and data element two has two versions (e2.1, e2.r2) (for this example, it may be assumed that version one (e2.r1) is the newly created element and version two (e2.r2) represents an update to the data element e2).

In state 310, the user requests to create a baseline of all data elements in the data store (named "baseline-1") as of the current time. In this case, the baseline generator 130 selects e1.r1 as the current version of data element e1, selects e2.r2 as the current version of data element e2, and includes e1.r1 and e2.r2 in baseline-1. In FIG. 3, the darker squares are used to highlight the versions of data elements that are added to baselines.

In state 3 320, two new versions have been added to the data store: e2 has been updated to version 3 (e2.r3) and a new element e3 (e3.r1) has been added.

In state 4 330, the user requests to create a baseline of all data elements in the data store (named "baseline-2") as of the current time. In this case, the baseline generator 130 selects e1.r1 (again), e2.r3, and ar1 and adds these to baseline-2.

In state 5 340, two new versions have been added to e3 (e3.r2, e3.r3).

In state 6 350, the user requests to create a baseline of all data elements in the data store (named "baseline-3") as of some previous time (rather than the current time). In this case, the baseline generator 130 selects e1.r1 (again), e2.r3 (again), and e3.r2 (rather than e3.r3 because the baseline is for some previous time).

The index for e1.r1 has been used in all three baselines, the index for e2.r3 exists in two baselines, and e2.r2, e3.r1 and e3.r2 each exist in a single baseline. Also, e3.r2 is a state of a data element in the past, the index store only contains the index elements for the most recent version (e3.r3), and so the baseline generator 130 relies on the indexing system 120 to re-create the index for e3.r2.

This support for baselining data elements that are not current allows the baseline generator 130 to create baselines while the data store 150 is being used. For example, with reference to FIG. 3, imagine that e3.r2 was the current revision when the user requests to create the baseline, and the baseline generator 130 identifies that version in a list of pending data elements to process. When the baseline generator 130 gets to that data element, which another user has updated, creating e3.r3, the baseline generator 130 simply re-indexes e3.r2 as if working on a baseline in the past.

In certain embodiments, an index element can be considered as a set of triples of the following form:
<URL of the Data Element Version><Property Identifier><Property Value>

FIG. 4 illustrates, in a block diagram, an example index element 400 in accordance with certain embodiments. In FIG. 4, the example uses the Resource Description Framework (RDF) N-Triples syntax.

An index element 162 is copied from the index store 160 into the baseline store 170 and augmented with particular properties to identify that the index element participates in one or more baselines 172. FIG. 5 illustrates, in a block diagram, an index element 500 that participates in three baselines in accordance with certain embodiments.

With embodiments, baseline tags that identify baseline participation are added to the index element, and this allows for the baseline generator 130 to "compress" the baseline store 170 by re-using index elements and reducing the number of overall baseline index elements and index properties the baseline store 170 stores. This not only has a positive impact on the storage requirements, but also on the performance of the overall system of computing device 100, as fewer index elements are faster to query over and the baseline generator 130 creates fewer index elements. Thus, the baseline generator 130 creates a baseline efficiently and quickly.

Figure 6A:
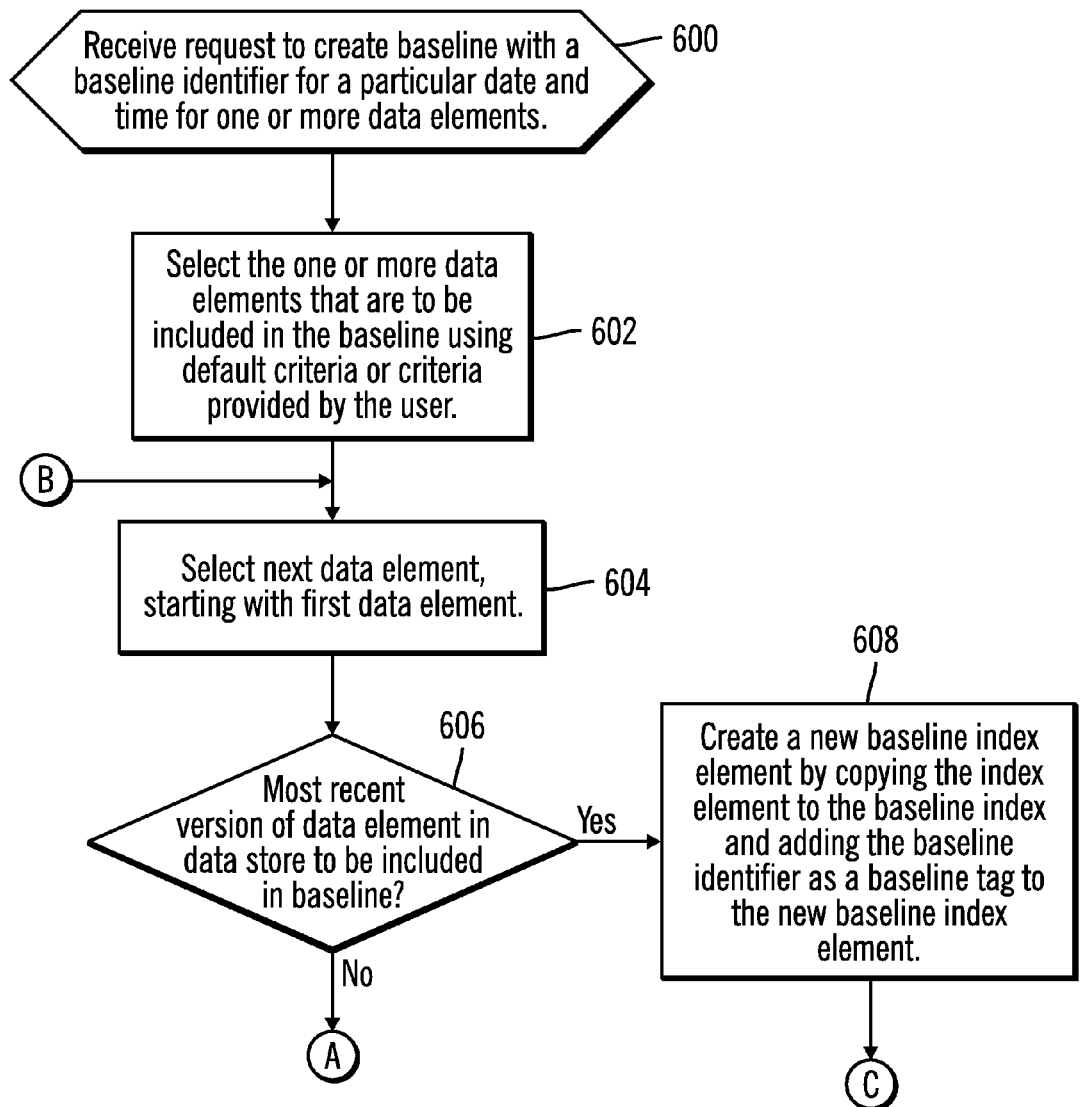
FIG. 6 illustrates, in a flow diagram, logic performed to create a baseline in accordance with certain embodiments.
Figure 6B:
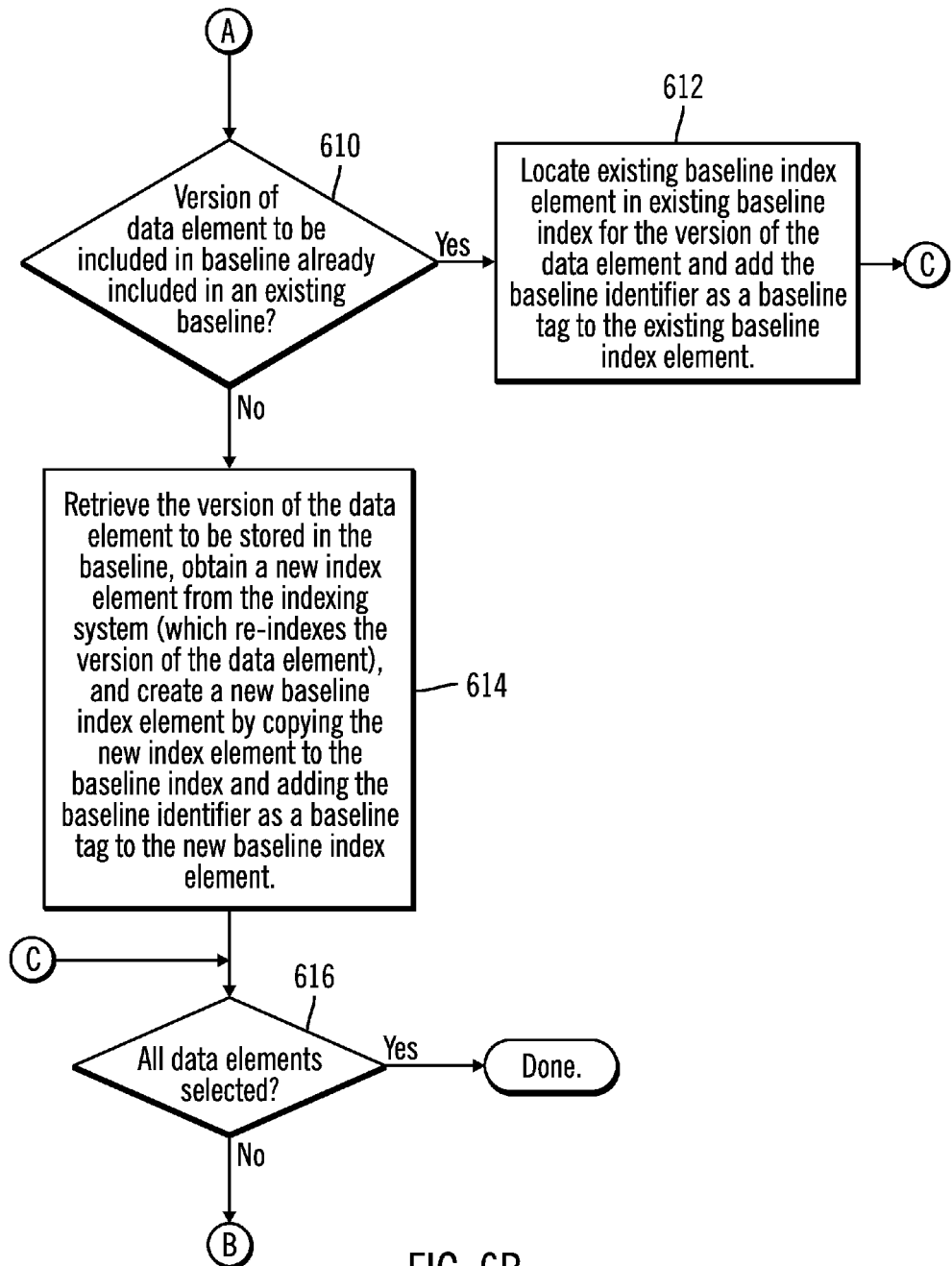

FIG. 6 illustrates, in a flow diagram, logic performed to create a baseline in accordance with certain embodiments. FIG. 6 is formed by FIGS. 6A and 6B. Control begins at block 600 with the baseline generator 130 receiving a request to create a baseline 172 with a baseline identifier for a particular date and time for one or more data elements 152. In certain embodiments, the request is from a user who specifies at least a timestamp that represents the baseline date/time and an identifier for the baseline 172. In certain embodiments, the user may also specify criteria whereby a subset of the data elements 152 stored in the data store 150 are included in the baseline 172.

In block 602, the baseline generator 130 selects the one or more data elements 152 that are to be included in the baseline 172 using either default criteria or criteria provided by the user. In certain embodiments, all data elements 152 in the data store 150 are selected.

Blocks 604-614 represent processing for each of the selected data elements 152. For the version of the data element 152 to be included in the baseline, the baseline generator 130 adds a reference to that version of the data element 152 to the baseline 172 and maintains a baseline index element in a baseline index 174 for the version of the data element 152, wherein the version is either a current version or a prior version. Maintaining the baseline index element may including creating a new baseline index element or updating an existing baseline index element with a new baseline tag.

In block 604, the baseline generator 130 selects the next data element 152 (from the selected one or more data elements 152), starting with the first data element 152. In block 606, the baseline generator 130 determines whether the most recent version of the data element 152 in the data store 150 is to be included in the baseline 172. If so, processing continues to block 608, otherwise, processing continues to block 610 (FIG. 6B). In block 608, the baseline generator 130 creates a new baseline index element by copying the index element 162 from the index store 160 to the baseline index 174 in the baseline store 170 and adding the baseline identifier as a baseline tag to the new baseline index element. That is, if the most recent version of the data element 152 in the data store 150 is to be included in the baseline 172, then the index element 162 is available in the index store 160 for this data element 152. From block 608, processing continues to block 616 (FIG. 6B).

In block 610, the baseline generator 130 determines whether the version of the data element to be included in the baseline is already included in an existing baseline. If so, processing continues to block 612, otherwise, processing continues to block 614. That is, if the data element 152 is already included in an existing baseline 172, then a corresponding baseline index element already exists in an existing baseline index 174. In block 612, the baseline generator 130 locates the existing baseline index element in the existing baseline index 174 for the version of the data element 152 and adds the baseline identifier (specified in the request) as a baseline tag to the existing baseline index element. Again, if the version of the data element 152 to be included in the baseline 172 is already included in an existing baseline 172, then the existing baseline 172 also has a corresponding baseline index 174 with a baseline index element for the data element 152, and, the baseline generator 130 updates this baseline index element. From block 612, processing continues to block 616.

If the version of the data element 152 to be included in the baseline 172 is not the most recent version of the data element 152 and is not included in an existing baseline 172, processing goes to block 614. In block 614, the baseline generator 130 retrieves the version of the data element 152 to be stored in the baseline 172, obtains a new index element 162 from the indexing system (which re-indexes the version of the data element 152), and creates a new baseline index element by copying the new index element 162 to the baseline index 174 and adding the baseline identifier as a baseline tag to the new baseline index element. That is, the baseline generator 130 invokes the indexing system 120 to create a new index element 162 for the version of the data element 152. This is done because the index store 160 does not save index elements 162 for every version of every data element 152.

Re-indexing may be described as indexing again. Any process that is used to extract or create an index element 162 from a data element 152 is invoked on the specific version of a data element 152 that participates in the baseline 172. For example, if there was some indexer for a binary data element, the indexer would be invoked again.

Thus, in some cases, the data element 152 is re-indexed. In general, typically a baseline 172 contains many of the same data element revisions, and so only new baseline tags are added to existing baseline index elements. Also, the second most likely case is that a selected data element 152 is still at the current version, and so the index element is copied to create a new baseline index element. The least frequent case is the one in which the data element 152 is re-indexed. Embodiments provide savings in terms of size of the storage and overall system performance in not having to store all index elements 162 for all data element revisions and specifically not having duplicated index elements 162.

Figure 7:
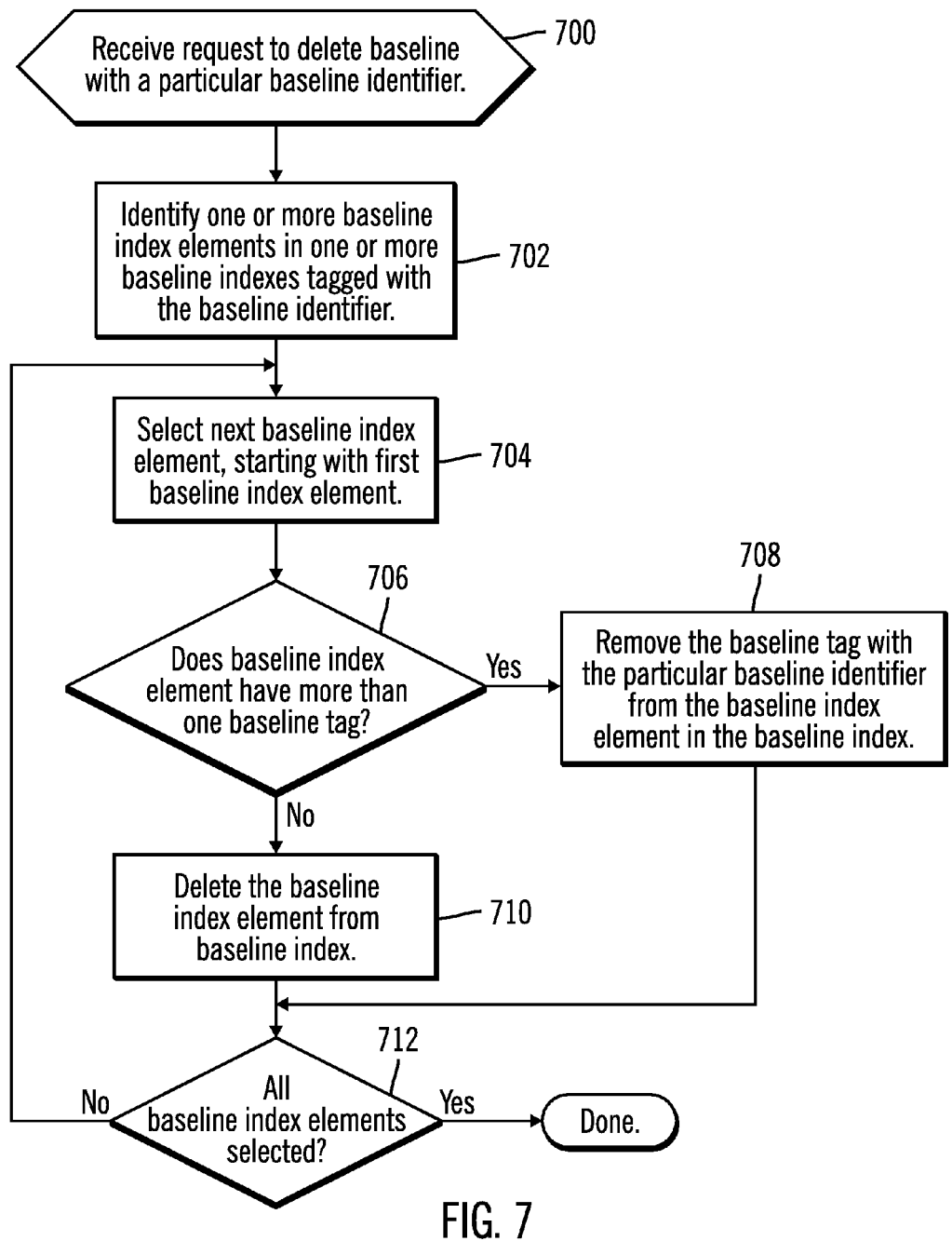
FIG. 7 illustrates, in a flow diagram, logic to delete a baseline in accordance with certain embodiments.

FIG. 7 illustrates, in a flow diagram, logic to delete a baseline 172 in accordance with certain embodiments. Control begins at block 700 with the baseline generator 130 receiving a request to delete a baseline 172 with a particular baseline identifier. In block 702, the baseline generator 130 identifies one or more baseline index elements in one or more baseline indexes 174 tagged with the baseline identifier (i.e., baseline index elements having baseline tags with the particular baseline identifier). In block 704, the baseline generator 130 selects the next baseline index element (from the selected one or more baseline index elements), starting with the first data element. In block 706, the baseline generator 130 determines whether the baseline index element has more than one baseline tag. If so, processing continues to block 708, otherwise, processing continues to block 710. In block 708, the baseline generator 130 removes the baseline tag with the particular baseline identifier from the baseline index element in the baseline index 174. This updated baseline index 174 is saved. From block 708, processing continues to block 712. In block 710, the baseline index element has one baseline tag (with the particular baseline identifier), and the baseline generator 130 deletes the baseline index element from the baseline index 174. From block 710, processing continues to block 712. In block 712, the baseline generator 130 determines whether all baseline index elements have been selected. If so, processing is done, otherwise, processing loops back to block 704.

Figure 8:
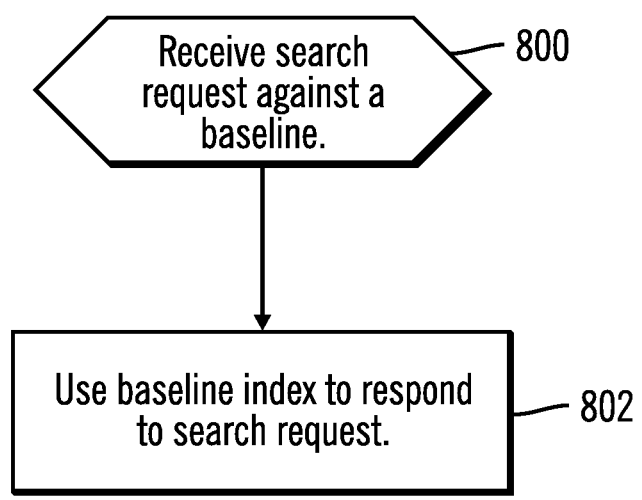
FIG. 8 illustrates, in a flow diagram, logic to use a baseline index in accordance with certain embodiments.

FIG. 8 illustrates, in a flow diagram, logic to use a baseline index in accordance with certain embodiments. Control begins at block 800 with receipt of a search request against a baseline 172. In block 802, a baseline index 174 that corresponds to the baseline 172 is used to respond to the request.

Thus, by copying only those index elements 162 to create baseline index elements (augmented with baseline tags) required to satisfy a baseline 172, the baseline generator 130 reduces storage cost and optimizes overall system performance. By supporting the re-indexing of data element versions, the baseline generator 130 can satisfy requests to create a baseline 172 in the past or satisfy a request to create a baseline 172 on a live system. By supporting tagging of baseline index elements, the baseline generator 130 is able to "compress" the baseline store 170 and re-use a baseline index element multiple times, where the baseline index element exists in multiple baselines 172.

Thus, with embodiments, the index elements 162 for a particular version of the data elements 152 included in a baseline 172 is included in a baseline index 174 and is queryable within the context of that baseline 172. However, the index store 160 does not maintain the index elements 162 for all versions of all data elements 152 contained within the data store 150.

Embodiments are useful for many Application Lifecycle Management (ALM) scenarios and products and to content-management solutions in which content is both versioned and the product supports some notion of a baseline of the content. Many content management solutions also have the notion of index properties assigned by either the content management system or the users that provide search and/or query enabled fields for categorization and retrieval. These indexes represent information about the data elements and the state of these properties corresponding to the particular version of a data element. With embodiments, such indexes are captured as part of a baseline so that the state of the data elements in the baseline are equally available for query and search.

Embodiments enable maintaining index elements 162 just for the current version of each versioned data element 152 and only those non-current (prior) versions of the data elements 152 that have been included in a baseline collection of data elements 152. Moreover, embodiments provide better storage utilization and faster search capabilities than conventional systems.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 9:
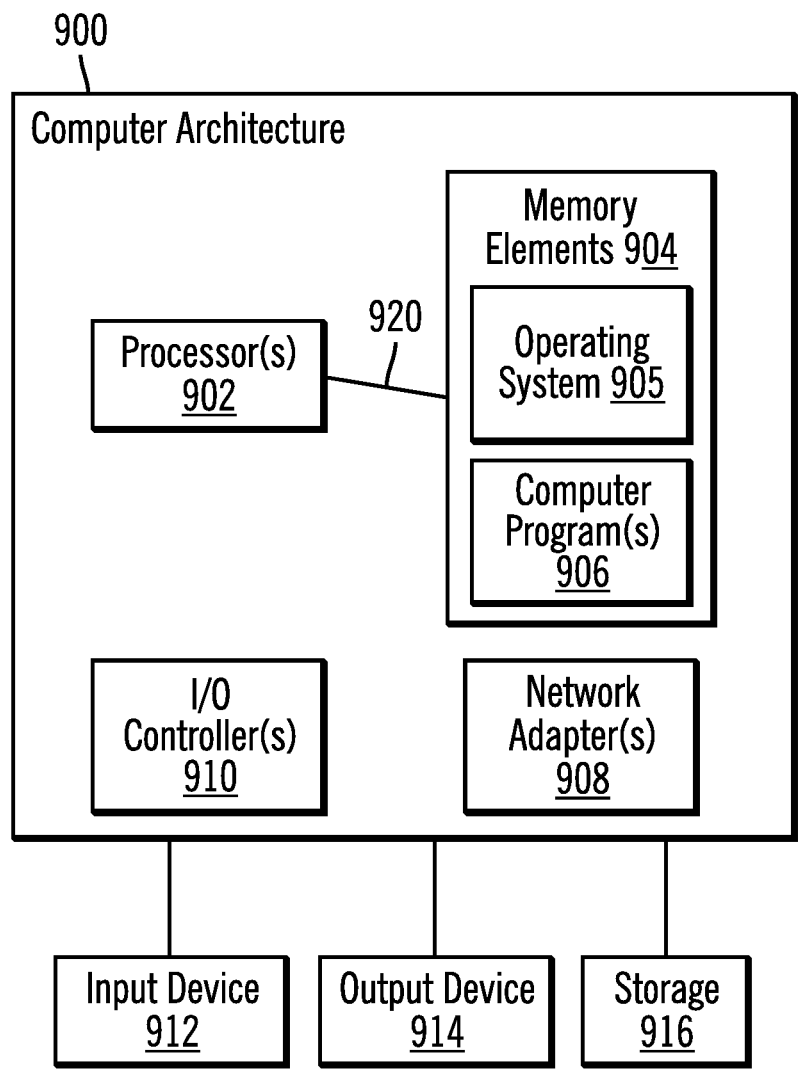
FIG. 9 illustrates, in a block diagram, a computer architecture that may be used in accordance with certain embodiments.

FIG. 9 illustrates, in a block diagram, a computer architecture 900 that may be used in accordance with certain embodiments. Computing device 100 may implement computer architecture 900. The computer architecture 900 is suitable for storing and/or executing program code and includes at least one processor 902 coupled directly or indirectly to memory elements 904 through a system bus 920. The memory elements 904 may include local memory employed during actual execution of the program code, bulk storage, and cache memories which provide temporary storage of at least some program code in order to reduce the number of times code must be retrieved from bulk storage during execution. The memory elements 904 include an operating system 905 and one or more computer programs 906.

Input/Output (I/O) devices 912, 914 (including but not limited to keyboards, displays, pointing devices, etc.) may be coupled to the system either directly or through intervening I/O controllers 910.

Network adapters 908 may also be coupled to the system to enable the data processing system to become coupled to other data processing systems or remote printers or storage devices through intervening private or public networks. Modems, cable modem and Ethernet cards are just a few of the currently available types of network adapters 908.

The computer architecture 900 may be coupled to storage 916 (e.g., a non-volatile storage area, such as magnetic disk drives, optical disk drives, a tape drive, etc.). The storage 916 may comprise an internal storage device or an attached or network accessible storage. Computer programs 906 in storage 916 may be loaded into the memory elements 904 and executed by a processor 902 in a manner known in the art.

The computer architecture 900 may include fewer components than illustrated, additional components not illustrated herein, or some combination of the components illustrated and additional components. The computer architecture 900 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
in response to determining that a version of a data element in a data store is to be included in a current baseline having a current baseline identifier and representing a set of data elements at a point in time and has not been included in another baseline,
adding a reference to the version of the data element to the current baseline; and
adding a new baseline index element for the version of the data element and the current baseline identifier to a current baseline index associated with the current baseline to record participation of the version of the data element in the current baseline; and
in response to determining that the version of the data element has been included in the another baseline,
locating a baseline index element in another baseline index associated with the another baseline for the version of the data element; and
adding the current baseline identifier to the located baseline index element to record participation of the version of the data element in the current baseline.

2. The method of claim 1, wherein the version of the data element is a most recent version of the data element.

3. The method of claim 1, wherein the current baseline comprises versions of specific data elements stored in a data store and index elements stored in an index store, and wherein the current baseline represents a state of the data store and the index store at a particular point in time.

4. The method of claim 1, wherein a request is received to create the current baseline at a specified date and time.

5. The method of claim 1, wherein a request is received that specifies criteria for selecting a subset of data elements in a data store to be included in the current baseline.

6. The method of claim 1, further comprising:
receiving a request to delete a particular baseline with a particular baseline identifier; and
removing the particular baseline identifier for the particular baseline.

7. The method of claim 1, further comprising:
updating another baseline index element.

8. A system, comprising:
a processor; and
storage coupled to the processor, wherein the storage stores a computer program, and wherein the processor is configured to execute the computer program to perform operations, the operations comprising:
in response to determining that a version of a data element in a data store is to be included in a current baseline having a current baseline identifier and representing a set of data elements at a point in time and has not been included in another baseline,
adding a reference to the version of the data element to the current baseline; and
adding a new baseline index element for the version of the data element and the current baseline identifier to a current baseline index associated with the current baseline to record participation of the version of the data element in the current baseline; and
in response to determining that the version of the data element has been included in the another baseline,
locating a baseline index element in another baseline index associated with the another baseline for the version of the data element; and
adding the current baseline identifier to the located baseline index element to record participation of the version of the data element in the current baseline.

9. The system of claim 8, wherein the version of the data element is a most recent version of the data element.

10. The system of claim 8, wherein the current baseline comprises versions of specific data elements stored in a data store and index elements stored in an index store, and wherein the current baseline represents a state of the data store and the index store at a particular point in time.

11. The system of claim 8, wherein a request is received to create the current baseline at a specified date and time.

12. The system of claim 8, wherein a request is received that specifies criteria for selecting a subset of data elements in a data store to be included in the current baseline.

13. The system of claim 8, wherein the operations further comprise:
receiving a request to delete a particular baseline with a particular baseline identifier; and
removing the particular baseline identifier for the particular baseline.

14. The system of claim 8, wherein the operations further comprise:
updating an another baseline index element.

15. A computer program product comprising a non-transitory computer readable storage medium including a computer readable program, wherein the computer readable program when executed by a processor on a computer causes the computer to perform:
in response to determining that a version of a data element in a data store is to be included in a current baseline having a current baseline identifier and representing a set of data elements at a point in time and that has not been included in another baseline,
adding a reference to the version of the data element to the current baseline; and
adding a new baseline index element for the version of the data element and the current baseline identifier to a current baseline index associated with the current baseline to record participation of the version of the data element in the current baseline; and
in response to determining that the version of the data element has been included in the another baseline,
locating a baseline index element in another baseline index associated with the another baseline for the version of the data element; and
adding the current baseline identifier to the located baseline index element to record participation of the version of the data element in the current baseline.

16. The computer program product of claim 15, wherein the version of the data element is a most recent version of the data element.

17. The computer program product of claim 15, wherein the current baseline comprises versions of specific data elements stored in a data store and index elements stored in an index store, and wherein the current baseline represents a state of the data store and the index store at a particular point in time.

18. The computer program product of claim 15, wherein a request is received to create the current baseline at a specified date and time.

19. The computer program product of claim 15, wherein the a request is received that specifies criteria for selecting a subset of data elements in a data store to be included in the current baseline.

20. The computer program product of claim 15, wherein the computer readable program when executed by the processor on the computer causes the computer to perform:
receiving a request to delete a particular baseline with a particular baseline identifier; and
removing the particular baseline identifier for the particular baseline.

21. The computer program product of claim 15, wherein the computer readable program when executed by the processor on the computer causes the computer to perform:
updating another baseline index element.

* * * * *